: US011021089B2

(12) United States Patent
Powell et al.

(10) Patent No.: US 11,021,089 B2
(45) Date of Patent: Jun. 1, 2021

(54) SUPPORT BRACKET AND HEADREST WITH SUPPORT BRACKET

(71) Applicants: James Powell, Sterling Heights, MI (US); Steve Almasian, Dearborn, MI (US); Joe Cahill, Troy, MI (US); Jim Beal, Sterling Heights, MI (US); Rick Cassidy, Fenton, MI (US); Gerd Truckenbrodt, Weiden (DE)

(72) Inventors: James Powell, Sterling Heights, MI (US); Steve Almasian, Dearborn, MI (US); Joe Cahill, Troy, MI (US); Jim Beal, Sterling Heights, MI (US); Rick Cassidy, Fenton, MI (US); Gerd Truckenbrodt, Weiden (DE)

(73) Assignee: GRAMMER AG, Ursensollen (DE)

(*) Notice: Subject to any disclaimer, the term of this patent is extended or adjusted under 35 U.S.C. 154(b) by 0 days.

(21) Appl. No.: 16/276,775

(22) Filed: Feb. 15, 2019

(65) Prior Publication Data
US 2019/0291618 A1 Sep. 26, 2019

(30) Foreign Application Priority Data
Feb. 22, 2018 (DE) .......................... 102018104072.5

(51) Int. Cl.
B60N 2/844 (2018.01)
B60N 2/815 (2018.01)

(52) U.S. Cl.
CPC .............. B60N 2/844 (2018.02); B60N 2/815 (2018.02)

(58) Field of Classification Search
CPC ...................................................... B60N 2/844
See application file for complete search history.

(56) References Cited

U.S. PATENT DOCUMENTS

| 6,302,485 | B1 | 10/2001 | Nakane et al. | |
| 8,979,203 | B1* | 3/2015 | Sutter, Jr. ............... | B60N 2/847 297/408 |
| 10,155,464 | B2* | 12/2018 | Boks ....................... | B60N 2/20 |
| 2005/0168020 | A1* | 8/2005 | Yetukuri ................ | B60N 2/838 297/216.12 |
| 2007/0148171 | A1 | 6/2007 | Lazar et al. | |
| 2007/0284929 | A1 | 12/2007 | Keller | |
| 2010/0244511 | A1* | 9/2010 | Gomes ................. | B60N 2/4221 297/216.12 |
| 2011/0148171 | A1 | 6/2011 | Charles et al. | |
| 2012/0068517 | A1* | 3/2012 | Yetukuri ................ | B60N 2/847 297/408 |

(Continued)

FOREIGN PATENT DOCUMENTS

| DE | 2208224 A1 * | 9/1973 | ............. B60N 2/838 |
| DE | 19951590 C1 | 1/2001 | |

(Continued)

Primary Examiner — Timothy J Brindley
(74) Attorney, Agent, or Firm — Andrew Wilford

(57) ABSTRACT

Inter alia, the invention relates to a support bracket (12) with two bar regions bracket on a vehicle seat, with a traverse (15) connecting the bar regions pivotally supporting a head contact part (11) of a headrest (10), and with locking means of a latch (17) for blocking pivoting the head contact part (11). The special feature is that the traverse (15) is made of plastic or a composite material and comprises attachment regions for securing to a support rod (13a, 13b) or is integrally connected with bar regions.

10 Claims, 13 Drawing Sheets

(56) References Cited

U.S. PATENT DOCUMENTS

| | | | | |
|---|---|---|---|---|
| 2014/0167476 A1* | 6/2014 | Wang | ............... | B60N 2/809 |
| | | | | 297/391 |
| 2014/0210245 A1* | 7/2014 | Tobata | ............... | B60N 2/847 |
| | | | | 297/408 |
| 2015/0266401 A1* | 9/2015 | Grable | ............... | B60N 2/844 |
| | | | | 297/408 |
| 2016/0288677 A1* | 10/2016 | Boks | ............... | B60N 2/20 |
| 2017/0274803 A1* | 9/2017 | Boks | ............... | B60N 2/838 |
| 2019/0168650 A1* | 6/2019 | Angelo | ............... | B60N 2/841 |
| 2020/0031264 A1* | 1/2020 | Jiang | ............... | B60N 2/844 |

FOREIGN PATENT DOCUMENTS

| | | | | |
|---|---|---|---|---|
| DE | 10236259 A1 | 2/2004 | | |
| DE | 102005050474 A1 * | 9/2006 | ............ | B60N 2/838 |
| DE | 102017009580 A1 * | 4/2019 | ............ | B60N 2/829 |
| EP | 1122122 A1 * | 8/2001 | ............ | B60N 2/865 |
| EP | 2777984 A1 * | 9/2014 | ............ | B60N 2/859 |
| EP | 3176029 A1 * | 6/2017 | ............ | B60N 2/838 |
| JP | 01201209 A * | 8/1989 | ............ | B60N 2/809 |
| JP | 5557946 B1 * | 7/2014 | ............... | B60N 2/58 |
| WO | WO-2006074080 A2 * | 7/2006 | ............ | B60N 2/844 |
| WO | WO-2014087488 A1 * | 6/2014 | ........... | B60N 2/5825 |
| WO | WO-2019174038 A1 * | 9/2019 | ............... | B60N 2/20 |

* cited by examiner

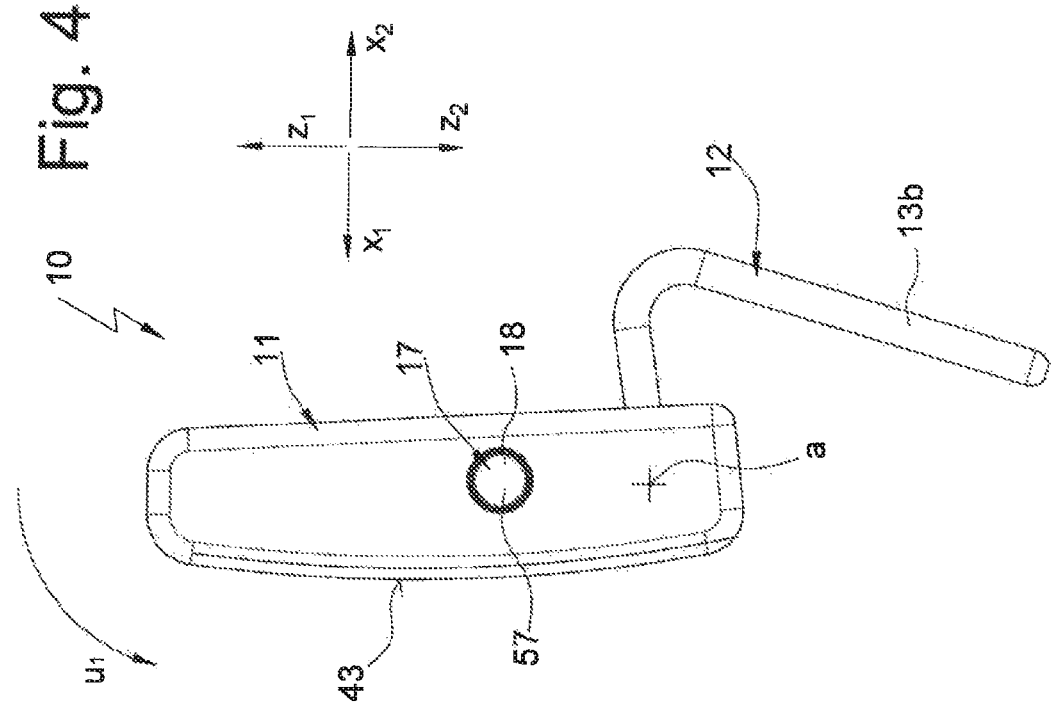
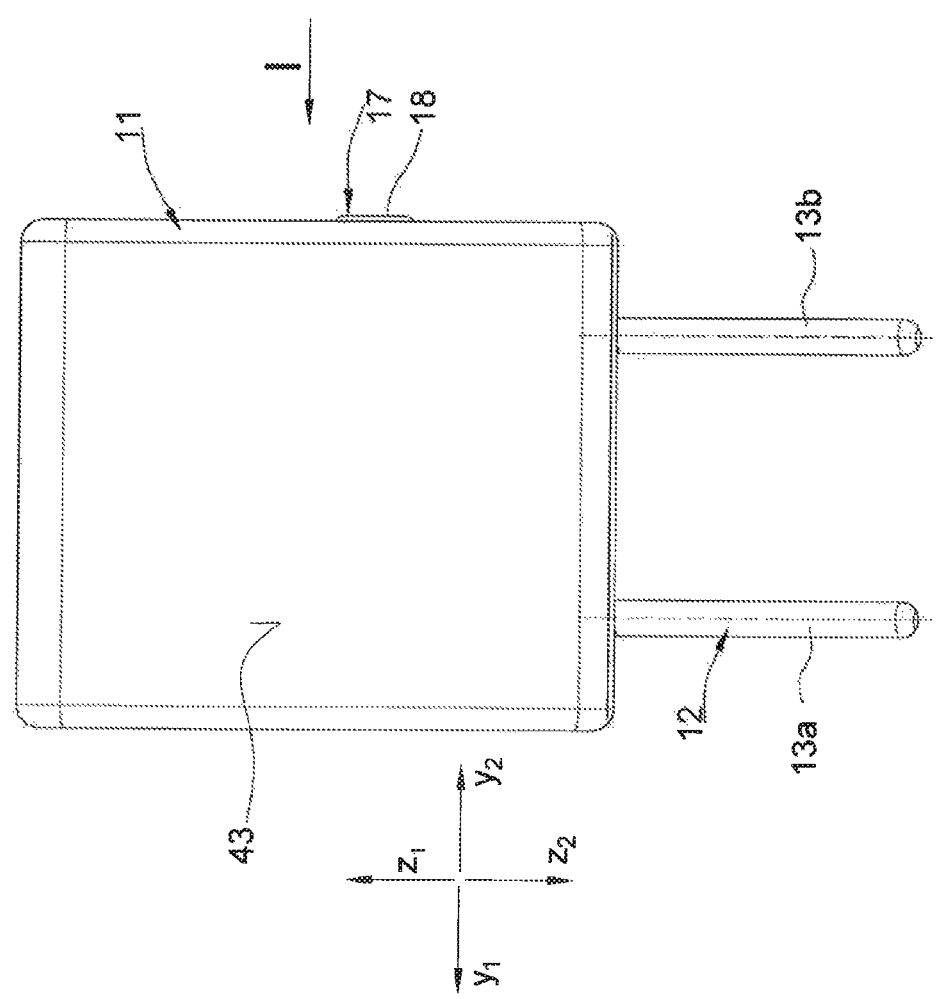

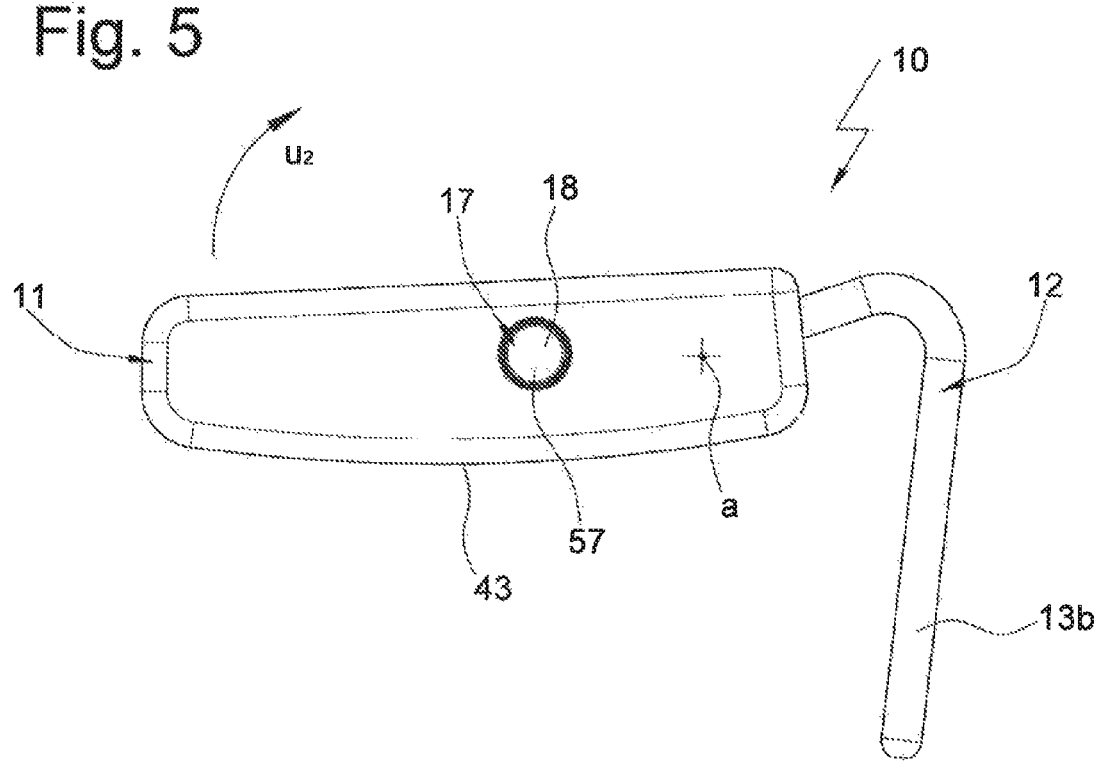

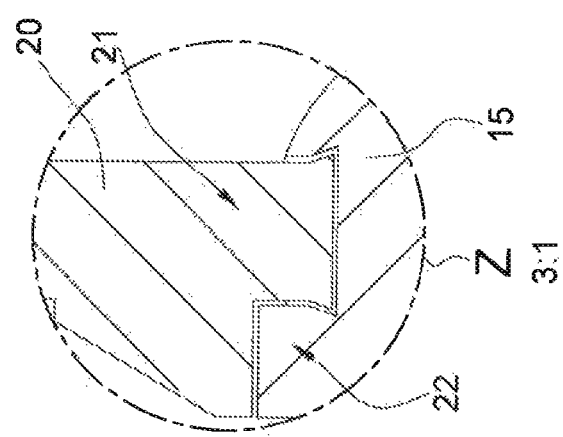
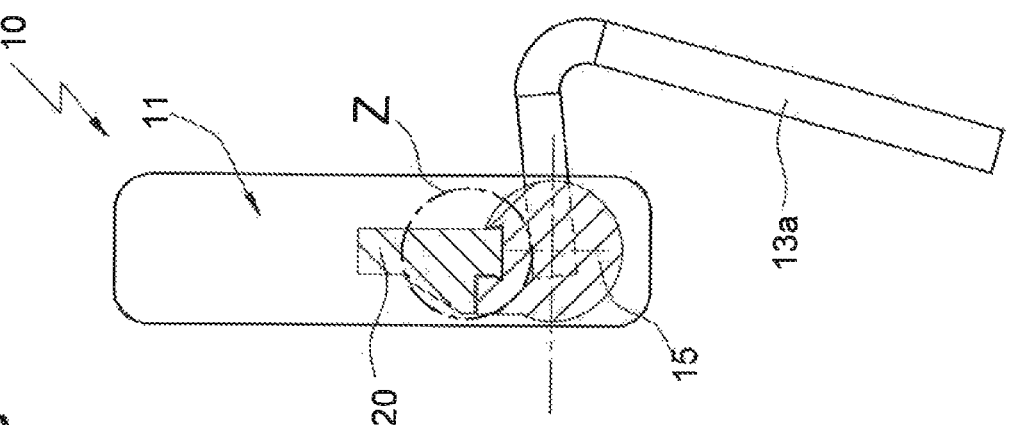
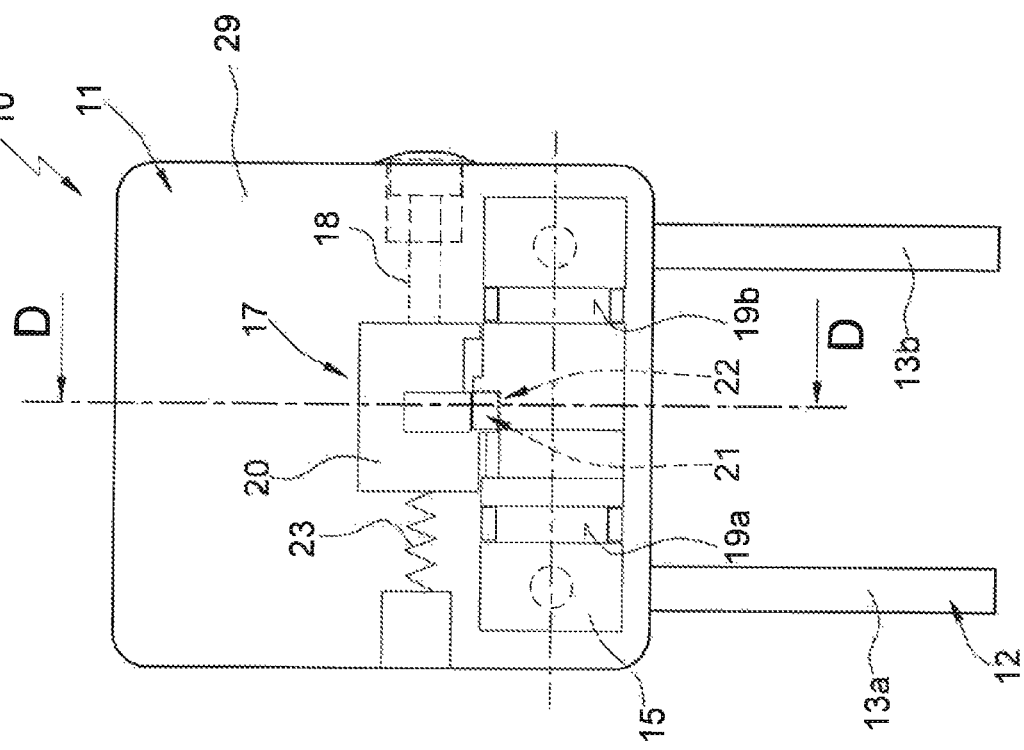

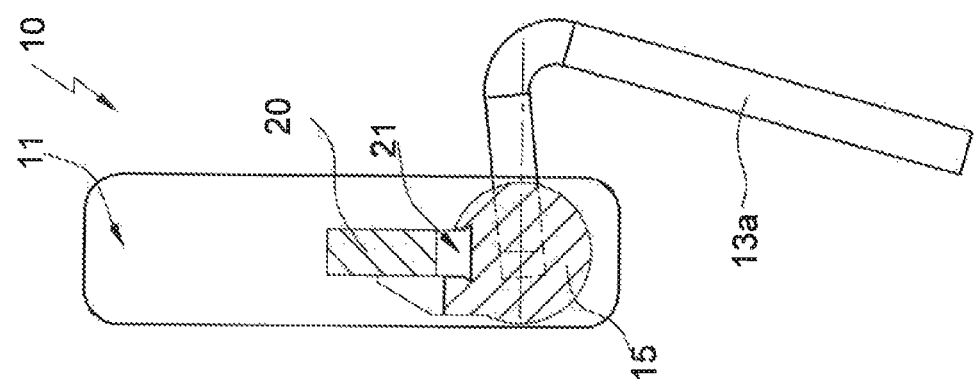
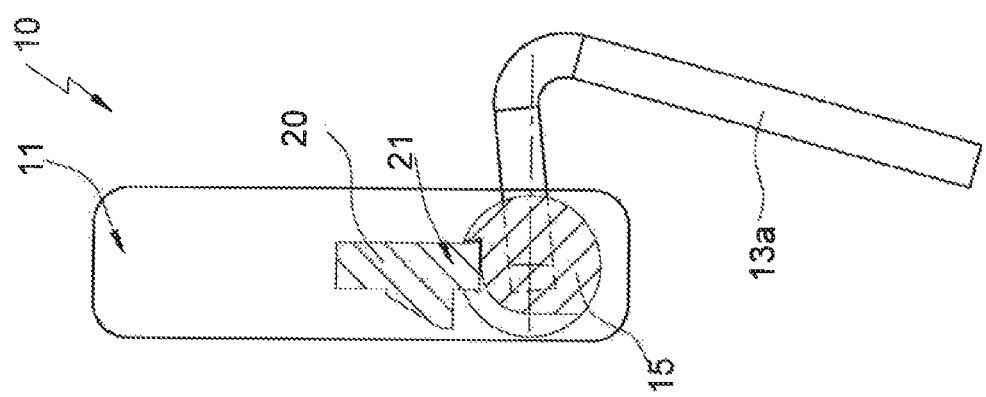
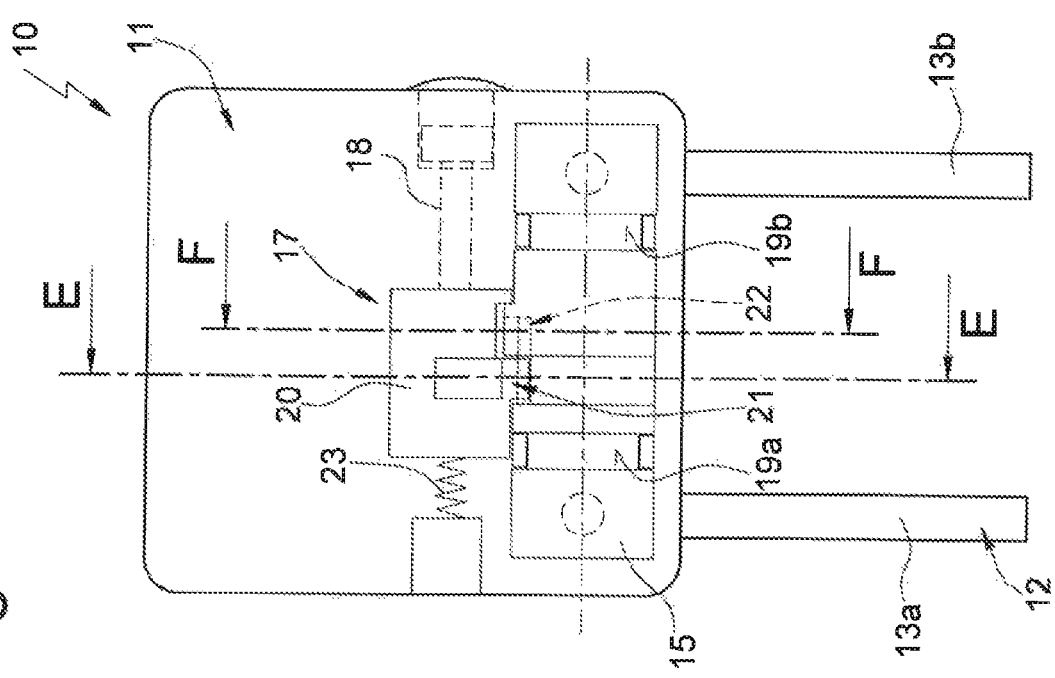

SUPPORT BRACKET AND HEADREST WITH SUPPORT BRACKET

FIELD OF THE INVENTION

The invention first relates to a support bracket. The support bracket comprises two support rods and a traverse connecting the bars.

BACKGROUND OF THE INVENTION

The traverse of such a support bracket is made of plastic or a composite material and comprises a first attachment region for attachment to a support rod as well as a second attachment region for attachment to another support rod.

Such a support bracket is known from DE 10 2010 061 308 [US 2010/0148171]. The traverse is formed from plastic and comprises latch elements that are part of a latch. A head contact part is shiftably guided on the support rods. A slider is mounted on the head contact part in a manner moveable between a latched position and a released position. A spring urges the slider into a latched position in which teeth of the slider cooperate with latch elements of the traverse. The slider can be actuated from outside by a push button.

FIELD OF THE INVENTION

The object of the invention is to provide headrest and a support bracket that makes additional features possible, in particular the option for pivotally supporting a head contact part.

SUMMARY OF THE INVENTION

The object is attained in that the support bracket comprises two support rods and a traverse connecting the support rods. The traverse is made of plastic or a composite material. For example the traverse can be made of a plastic material with at least one further component, for example of a fiber-reinforced plastic material.

The traverse comprises for example at least one attachment region for attaching a support rod. For example, the traverse comprises a first attachment region for attachment of a first support rod and a second attachment region for attachment on a second support rod. The attachment region is for example formed as a seat. The seat can for example be formed as a recess in the traverse complementary to the support rod end. The support rod ends can then simply be inserted into the hole of the bracket.

According to an alternative, the support rods and the traverse can be integrally formed of plastic or of a composite material.

Due to the traverse being made of plastic or of a composite material, a weight reduction of the support bracket is achieved. Furthermore, diverse functional surfaces can be molded on the traverse. These can be relatively freely designed.

One embodiment is characterized in that slide surfaces for the pivotal slide mounting of a head contact part are molded on the traverse. Such slide surfaces can be used directly pivotally supporting a head contact part. It is not necessary that additional parts are provided on the traverse that are provided with the slide surfaces. For example, corresponding counter-surfaces are attached or molded on the head contact part, which surfaces cooperate with slide surfaces in order to make pivoting of the head contact part possible.

For example, in one embodiment at least one lock seat is molded on the traverse for blocking the head contact part in at least one pivot position. One or multiple lock seats can be molded on the traverse to prevent pivoting of the head contact part in at least one direction and in at least one pivot position. The lock seat is for example provided as a part of a latch and is for example shaped for a form-fitting engagement of a moveable latch element held on the head contact part. The lock seat can for example comprise at least one counter-bearing surface that prevents movement of the head contact part in a pivot direction or in two opposite pivot directions. The lock seat can for example comprise at least one surface which makes movement of the head contact part into at least one pivoting direction possible in the latched position of the latch.

On the traverse, for example a guide with at least one guiding surface is molded that is suitable to guide the latch element into engagement with the lock seat when the head contact part is being moved from an unlatched position to a position to be latched. The guide can be formed for example by a wall molded on the traverse that holds a latch element—for example across a certain pivot angle—in the released position. For example, the latch element can be held in the released position by the guide surface when the head contact part is being moved to the nonuse position. The guide surface ends for example briefly before a position in which the latch element can be moved back into the latched position by a spring, for example.

One embodiment of the invention provides that at least one stop surface is molded on the traverse in order to cooperate with a counter surface of the head contact part or with one of its components and to limit the pivoting of the head contact part into at least one pivot direction. In other words, the at least one stop surface limits the pivoting with respect to a first pivot direction or with respect to two opposite pivot directions. The limitation of the pivoting range of the head contact part can be effected by a cooperation of a stop surface of the traverse and a counter-surface of the head contact part.

On the attachment region for the support rod, in particular on the seat, for example at least a first stop formation is formed that prevents straight-line movement of the support rod relative to the head contact part in the demounting direction and/or a rotation of the support rod relative to the head contact part. The stop formation can for example be formed by a pin that engages through at least one recess of the support rod and at least one recess of the seat in such a way that movement in the demounting direction and a rotation relative to the seat is prevented.

Furthermore, the invention relates to a headrest. The headrest comprises a head contact part that is pivotably-mounted on the traverse of a support bracket.

Such a headrest is known from EP 1 862 352 [US 2007/0284929]. A head contact part is pivotal on the traverse of a support bracket and can be latched in different positions of use. For this purpose, a latch comprises a latch element that is assigned to the head contact part, as well as lock disks provided with multiple lock seats that are fixed in the support bracket. The latch element is displaceable between a lock position in which the latch element is in engagement with one of the lock seats and a released position in which the latch element is out of engagement with the lock seats.

According to a second aspect of the invention, it is the object of the invention to provide a headrest that can be made in a simpler manner and which has a larger variability with respect to its features.

The headrest comprises a headrest bracket according to the first aspect of the invention, as well as a head contact part. In the context of the invention, the term head contact part shall include single-piece head contact parts as well as assemblies. The head contact part is mounted on the support bracket pivotal between a first end position and a second end position. At least one use position and/or at least one nonuse position is/are located between the end positions.

The headrest according to the invention can be made using only a few parts. It is characterized by low weight and low production costs. In terms of further advantages, reference is made to the configurations relating to the first aspect of the invention.

The head contact part forms for example at least one bearing surface that cooperates with the slide surface of the traverse and forms a pivot bearing. The bearing surface is for example molded on a base part of the head contact part made of plastic material. The base part can for example be formed by a housing. The housing can be readily made from plastic material together with the bearing surfaces, for example. No additional processing of the surfaces is necessary. The housing can consist of two parts, for example. A high-density polyethylene (HDPE) plastic material can be used to make the housing.

The headrest comprises for example a latch by means of which the head contact part is lockable in at least one pivot position. The latch is moveable between a latched position and a released position. In the latched position, movement of the head contact part into at least one pivot direction, i.e. in a pivot direction or into two opposite pivot directions, is not possible. In the released position, the head contact part can be pivoted into one of two opposite pivot directions unless the head contact part is situated in an end position.

A latch element is for example on the head contact part and is moveable between the latched position and the released position. The latch element is part of the latch. In the latched position, the latch element is in engagement with the lock seat of the traverse. In the released position, the latch element is out of engagement with the lock seat. The latch element is for example held on a base part of the head contact part in such a way that it is non-moveable in the opposite pivot directions relative to the base part. For example, it has merely one degree of freedom in a direction transverse to the pivot direction.

According to one embodiment, the latch element is configured as a slider that is moveably-mounted on the head contact part. The latch element is for example held on a slider that is moveable between the latched position and the released position in a translatory manner. The slider is for example moveable from outside by an actuation between the latched position and the released position.

The counter surface is for example formed on the head contact part and cooperates with the stop surface of the traverse in order to restrict the movement range of the pivoting of the head contact part. The counter surface is for example formed on a housing of the head contact part, or for example one a latch element comprised by the head contact part. The counter-surface can for example cooperate with the stop surface for example to determine the end positions of the movement of the head contact part or for example in at least one lock position. In this case, the counter-surface transmits forces from the head contact part to the stop surface of the traverse.

The stop surface of the traverse cooperates for example with different counter surfaces in different positions. For example, the stop surface cooperates with a latch element of the head contact part in a use position in which the latch is situated in the latched position. In an nonuse position in which the head contact part has been pivoted around a certain pivot angle with respect to a use position, for example about a pivot angle of approximately 90° for example a housing surface of the head contact part cooperates with the stop surface.

The latch element is for example formed in such a way that it includes at least one projection with a counter surface which extends radially to the pivot axis of the head contact part and cooperates with a stop surface when the head contact part is in a use position. For example, the counter surface cooperates for example merely in the latched position with the stop surface while the surfaces are separated from one another in the released position. The projection forms a lever arm so that high forces acting on the head contact part are transmitted to the traverse from for example the latch element mounted on the head contact part. The at least one projection can be formed in such a way that it can transmit forces that act in a first pivot direction, in a second pivot direction, or in both pivot directions.

In the other case, in which the latch element is mounted on the traverse, the latch element forms a stop surface which cooperates with a counter surface of the head contact part in the latched position.

According to another embodiment, the latch element of the latch is actuatable by an actuation from outside on the head contact part. A housing of the head contact part comprises for example at least one recess for operating the actuation. The recess is for example covered by an elastically deformable plastic skin in such a way that the actuation can be actuated via the plastic skin.

BRIEF DESCRIPTION OF THE DRAWING

Further advantages result on the basis of the description of an embodiment schematically shown in the drawing. The drawing shows in:

FIG. 3 a front view of the headrest in a use position,

FIG. 4 a side view of the headrest according to arrow I in FIG. 3,

FIG. 5 a side view of the headrest in the nonuse position,

SPECIFIC DESCRIPTION OF THE INVENTION

Figure 1:
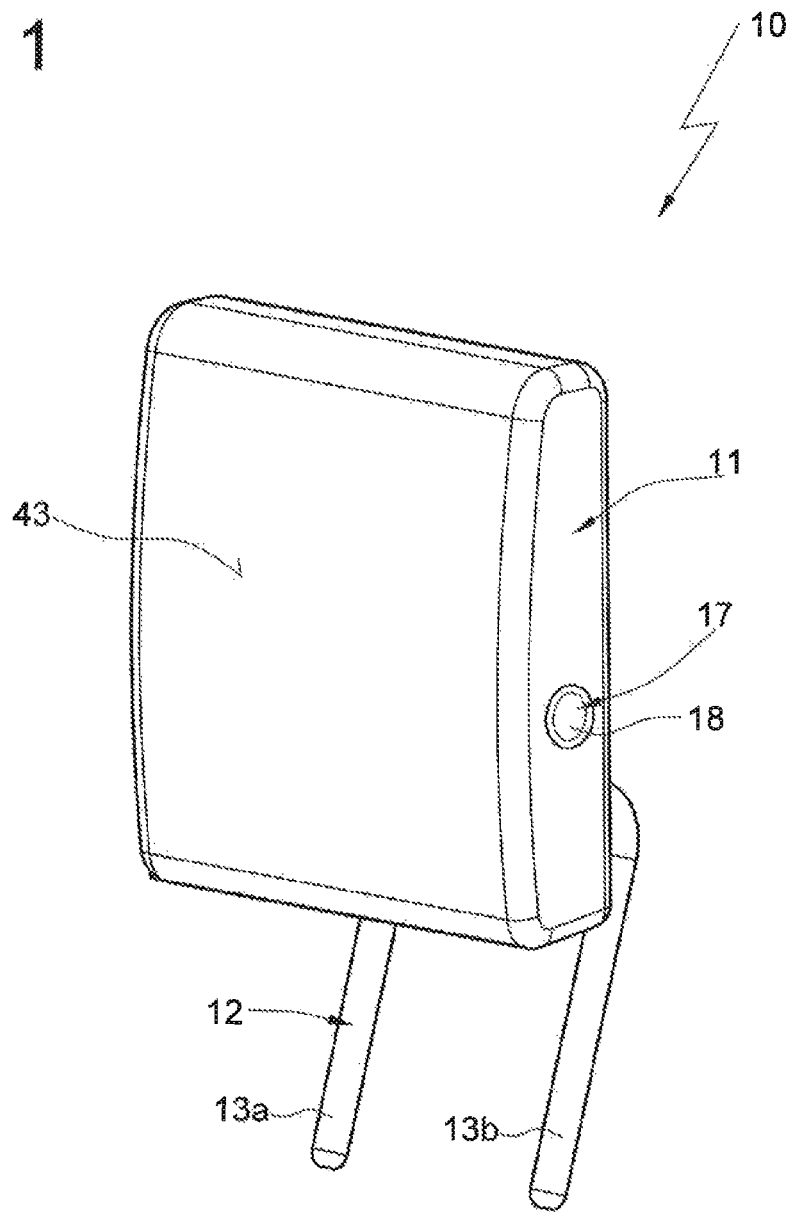
FIG. 1 a perspective view of the headrest in a use position.

A headrest as a whole is indicated with reference character 10 throughout the drawing. Like reference characters relate to corresponding parts in the different figures even though small letters are added or omitted.

According to FIGS. 1 to 5, the headrest 10 comprises a head contact part 11 with a head contact surface 43 that is mounted on a support bracket 12. The support bracket 12 comprises support rods 13a and 13b with free ends 14a and 14b. The upper ends 16a and 16b opposite the lower ends 14a and 14b are connected with a traverse 15 (see FIG. 2). The traverse 15 forms a pivot axis a for the head contact part 11 that is pivotal between a use position (see for example FIGS. 1, 3, and 4) and an nonuse position (see for example FIG. 5). Springs 25a and 25b that respectively urge the head contact part 11 with one spring end 27b and are held in a seat 28 of the traverse 15 with another spring end 27a urge the head contact part 11 into the nonuse position.

The head contact part 11 is arrestable in the use position by a latch 17. The latch 17 is movable between a latched position and a released position. The latch 17 is urged by a spring 23 (see for example FIG. 2) into the latched position. By moving a button 18 that can be operated from outside in the direction $y_1$ the latch 17 can be moved against the force of the spring 23 from the latched position to the released position. In a return of the latch 17 to the latched position caused by the spring 23, the button 18 is also displaced in the direction $y_2$ to the initial position.

In the latched position, the head contact part 11 is fixed against pivoting in a use position. In other words, the head contact part 11 can be pivoted neither in the direction $u_1$ nor in the direction $u_2$. In the released position, the head contact part 11 is moveable between the use position and the nonuse position. A housing 60 of the head contact part 12 is moveable relative to the support bracket 12 merely in the pivot directions $u_1$ and $u_2$, i.e. it is not-moveable in the directions $x_1$, $x_2$, $y_1$, $y_2$, as well as $z_1$ and $z_2$. In a manner known per se, the support rods 13a and 13b can be supported in backrest-fixed guides of a seat in a height-adjustable manner.

In the present embodiment, merely an arresting in the use position is provided. According to an alternative configuration, the headrest could also be equipped with a locking mechanism in the nonuse position or in other positions.

Figure 2:
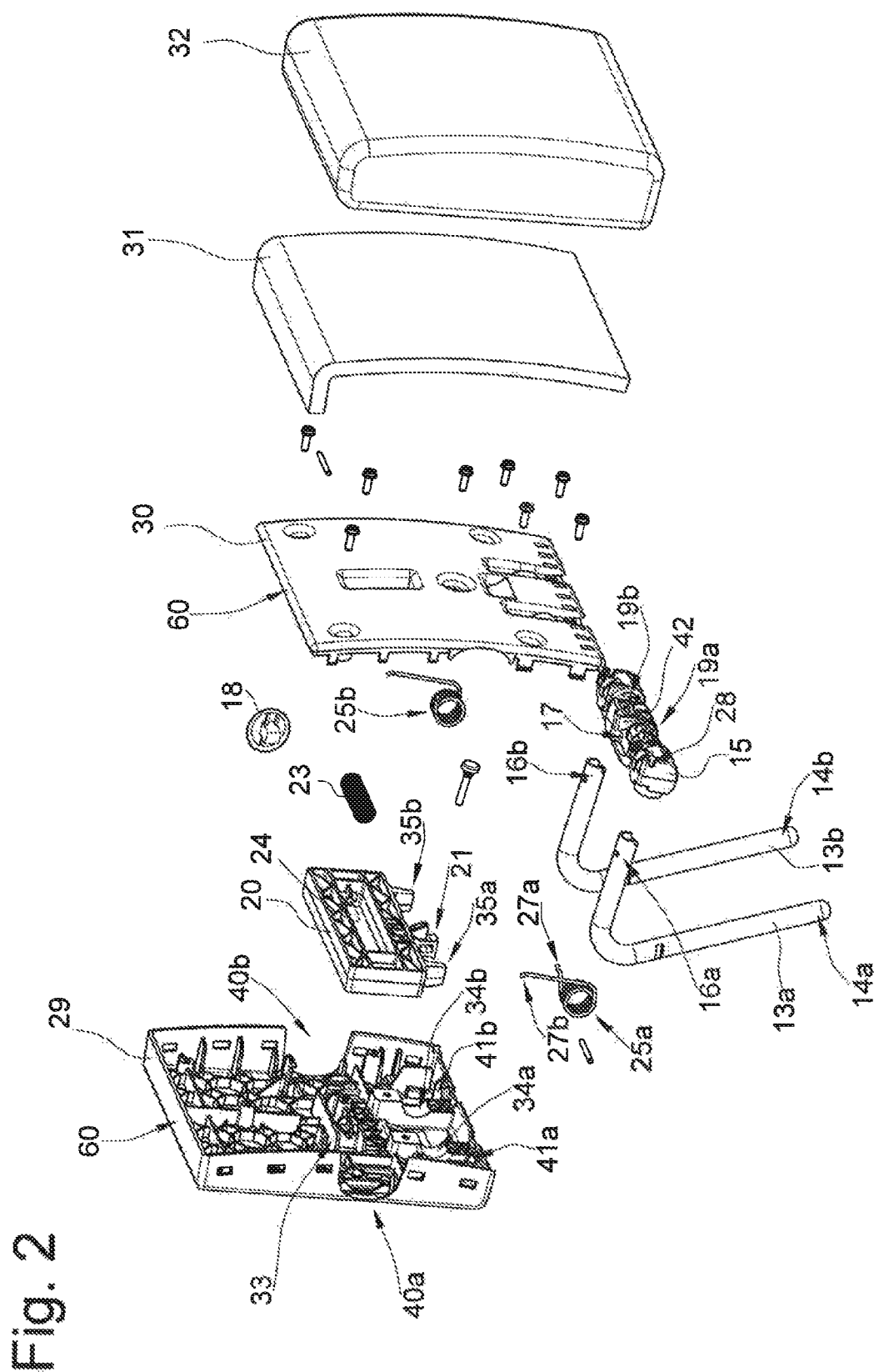
FIG. 2 an exploded view of the headrest.

FIG. 2 is an exploded view of the headrest 10. It is discernable that the support bracket 12 includes the support rods 13a and 13b and the traverse 15. The traverse 15 is provided with slide surfaces 19a and 19b pivotally supporting the head contact part 11. Furthermore, the traverse 15 comprises parts of the latch 17 as well as a seat 28a for the reception of the spring end 27a of the spring 25a and a seat 28b for the reception of the spring end 27a of the spring 25b. In the traverse 15, holes 44a and 44b are formed as well, (not discernable in FIG. 2), and the hole 44a is provided to receive the end 16a of the support rod 13a, and the hole 44b is provided to receive the end 16b of the support rod 13b.

The head contact part 11 comprises a rear part 29 as well as a front part 30 of a housing 60, a cushion part 31, a cover 32 in the form of a slip-cover, as well as a latch element 20 formed as a slider that is part of the latch and the springs 23 and 25a and 25b.

The rear part 29 is formed with a guide device 33 for guiding the latch element 20, receptacle trunnions 26a and 26b for holding the spring 23, as well as bearing structures 34a and 34b pivotally supporting the head contact part 11 on the traverse 15. Supplementary bearing structures that are not shown in FIG. 2, are formed on the front part 30. The bearing structures 34a and 34b of the rear part 29 as well as the bearing structures of the front part 30 together form bearing surfaces 56a and 56b, wherein the bearing surface 56a cooperates with the bearing surface 19a, and the bearing surface 56b cooperates with the bearing surface 19b in order to mount the head contact part 11 on the traverse in a pivotal manner by a slide bearing. Laterally, the rear part 29 comprises recesses 40a and 40b for operating the button 18 from outside, as well as recesses 41a and 41b that are provided for the passage of the support rods 13a and 13b.

Figure 6:
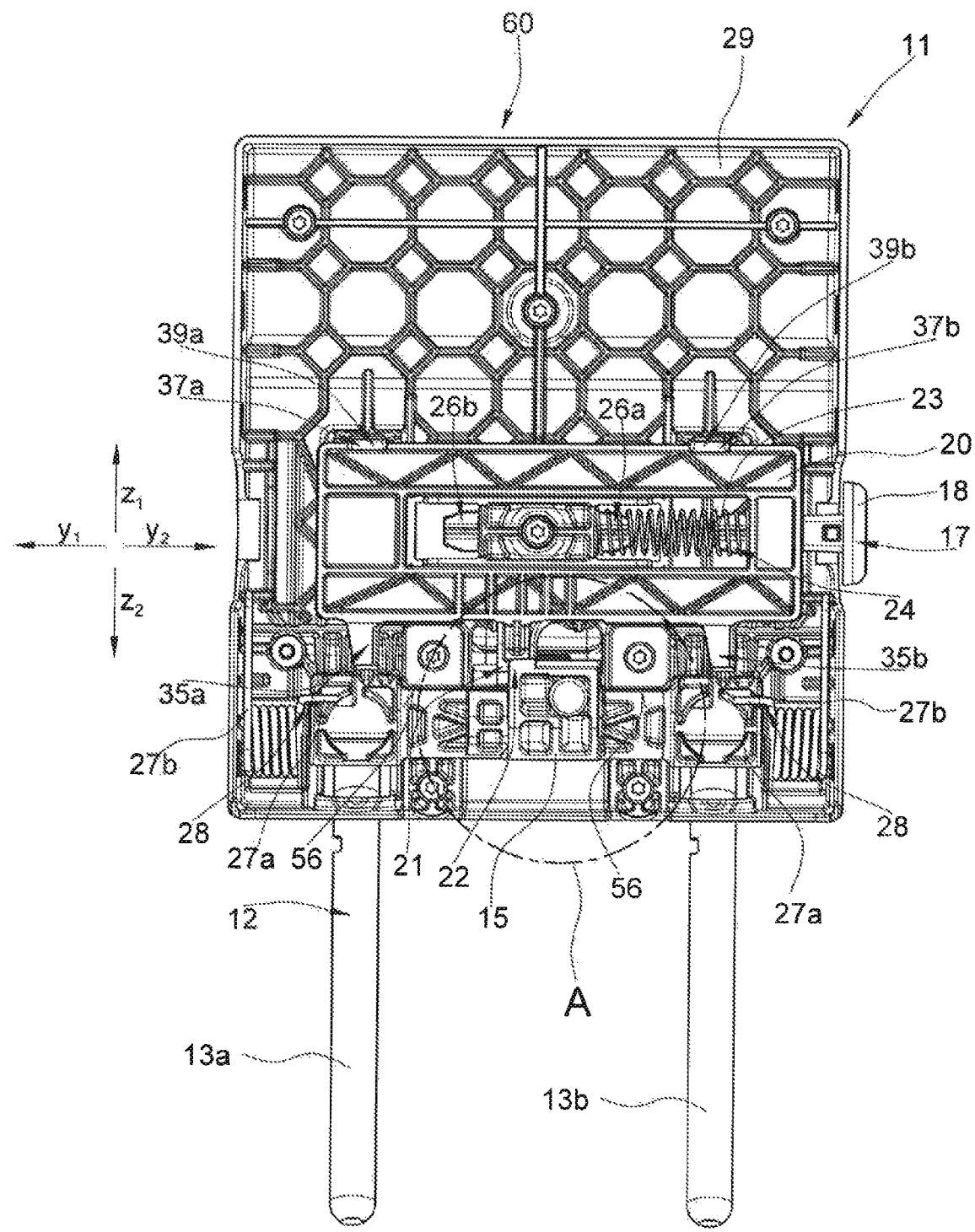
FIG. 6 a front view of the headrest according to FIG. 3 with the latch in the latched position and the cushion and a front part of a housing of the head contact part not illustrated, FIG. 7 a perspective view of the headrest with the latch in the released position and the cushion and a front part of the housing not illustrated, FIG. 8 a view of a detail along section line A in FIG. 6, FIG. 9 a sectional view along section line B-B in FIG. 8, FIG. 10 a view of a detail according to FIG. 8 with the latch element is in the released position, FIG. 11 a sectional view according to the section line C-C in FIG. 10, FIG. 12 a perspective view of the traverse as a single component, FIG. 13 a front view of the traverse, FIG. 14 a view according to arrow G in FIG. 13, FIG. 15 a view according to arrow H in FIG. 14, FIG. 16 a schematic front view of a second embodiment of the headrest in the use position with the latch in the latched position, FIG. 17 a schematic sectional view of the headrest according to section line D-D in FIG. 16, FIG. 17*a* a detail according to section line Z in FIG. 17, FIG. 18 a front view of the headrest according to FIG. 16 with the latch in the released position, FIG. 19 a sectional view according to the section line E-E in FIG. 18, FIG. 20 a sectional view according to the section line F-F in FIG. 18, FIG. 21 a sectional view of the headrest in the style of FIG. 19 in the nonuse position, FIG. 22 a sectional view of the headrest in the style of FIG. 20 in the nonuse position.
Figure 7:
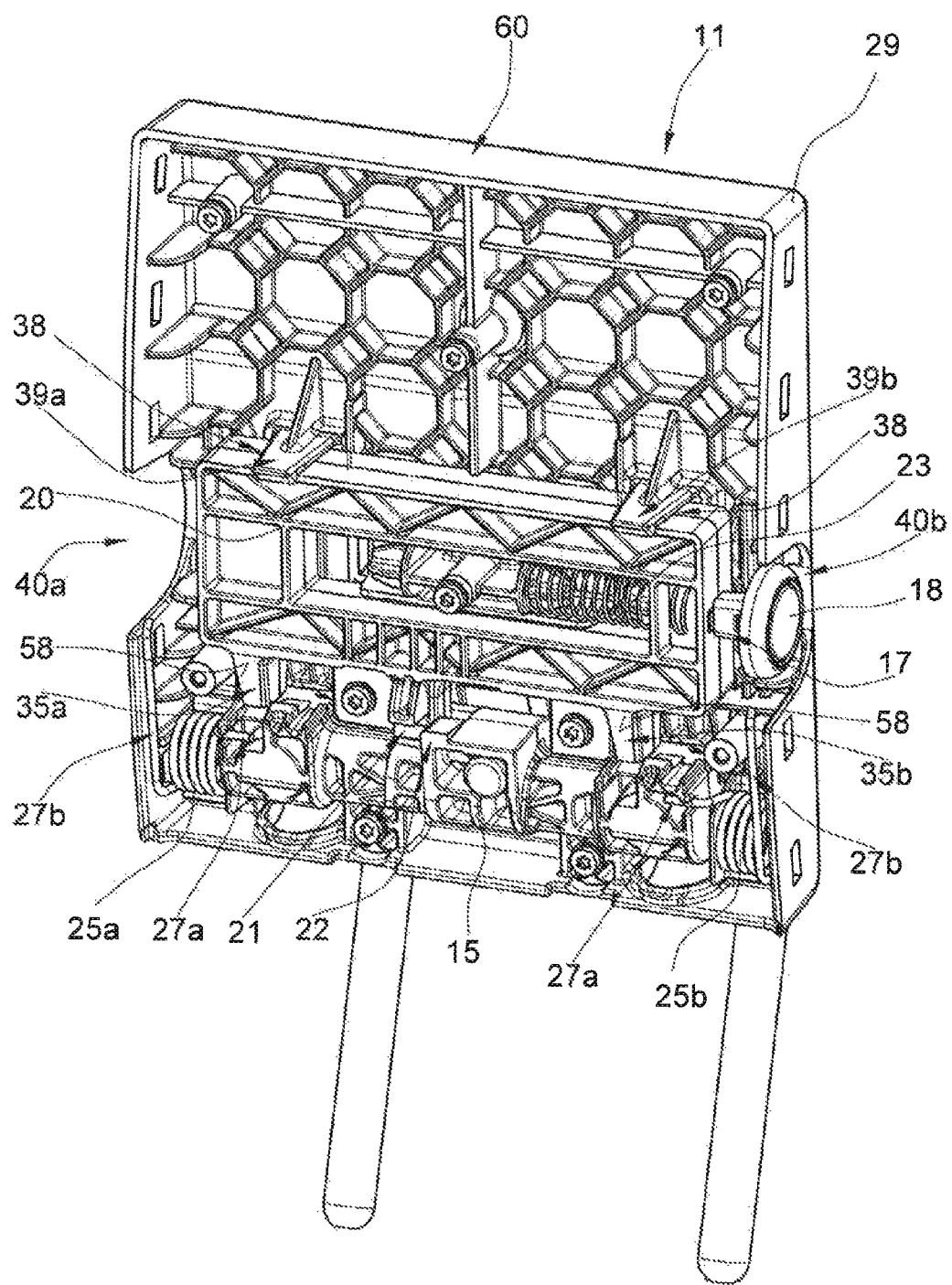

In FIG. 6, the headrest 10 is shown without the front part 30 of the housing 60. As shown in FIG. 6 that the latch element 20 includes the reception trunnion 24 for an end (right end in FIG. 6) of the spring 23 that is molded on the latch element 20 in the present embodiment. The reception trunnion 26a for the other end of the spring 23 is, as mentioned above, on the rear part 29 of the head box.

Figure 11:
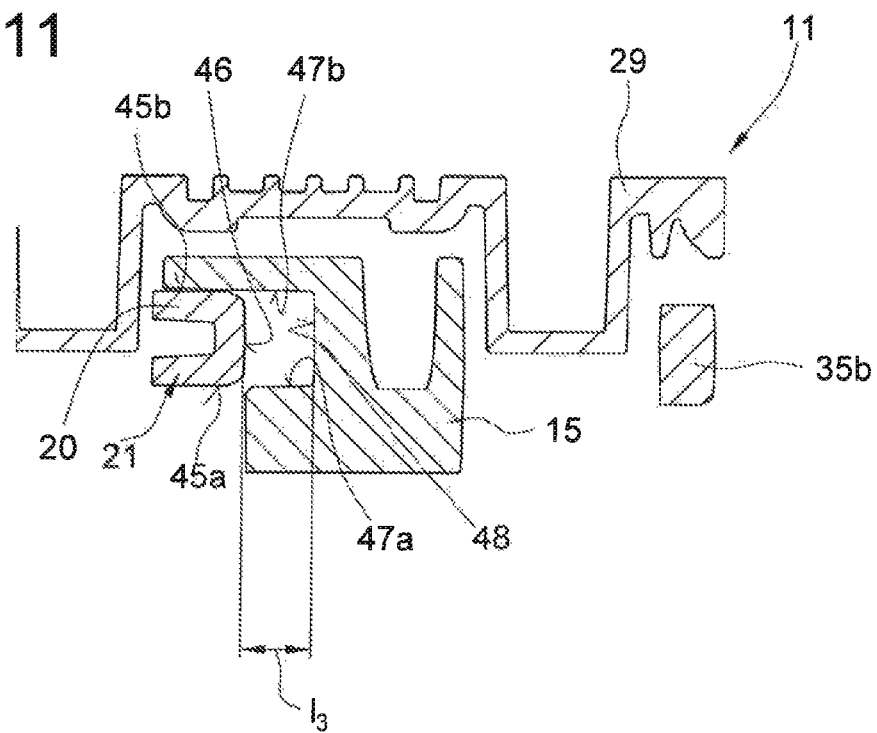

The latch element 20 is mounted for straight-line movement in the direction $y_1$ and $y_2$ relative to the housing 60, i.e. relative to the rear part 29 and to the front part 30. The latch element 20 can be moved in the direction $y_1$ to the released position shown in FIG. 11 from the latched position according to FIG. 6. The latch element 20 can be moved in the direction $y_2$ to the latched position from the released position. The latch element 20 is not moveable relative to the housing 60 in the directions $z_1$ and $z_2$ as well as in the directions $x_1$ and $x_2$.

The latch element 20 comprises extensions 35a and 35b on its lower side. In the latched position, a front surface 58 of the extension 35a cooperates with a stop surface 55 (not discernable in FIG. 6) of a projection 59a of the traverse 15, and a front surface 58 of the extension 35b cooperates with a stop surface 55 of a projection 59b of the traverse 15.

The guide device 33 for the latch element 20 comprises projections 37a and 37b that respectively form slide surfaces 38 for the latch element 20 and that respectively are provided with hook structures 39 that engage around the latch element 20 in order to prevent one degree of freedom in the direction $x_1$.

The latch element 20 is moveable from the latched position shown in FIG. 6 in the direction $y_1$ to the released position against the force of the spring 23 by the button 18. If the force applied to the button 18 decreases, the latch element 20 and along with it the button 18 are moved back to the latched position in the direction $y_2$ by the spring 23.

The button 18 engages through the recess 40b without being guided on the housing 60. A faceplate 57 that is not shown in FIG. 6, covers the recess 40b in the mounted state of the headrest 10 in such a way that the button 18 is actuatable via the faceplate 57.

In the present embodiment, the button 18 is arranged on the left side of the head contact part 11, but the button 18 and the spring 23 can likewise be mounted on the right side of the head contact part 11. For this purpose, another embodiment of the traverse 15 is provided in which the strike 22 is formed in a mirror-symmetrical manner with respect to the traverse 15 shown in this embodiment. The rear part 29 of the head box and the latch element 20 can be used in identical fashion. For this purpose, a further receptacle trunnion 26b for the spring 23 is provided on the rear part 29. In this case, the latch element 20 is mounted in a manner turned by 180° around the z-axis.

Figure 8:
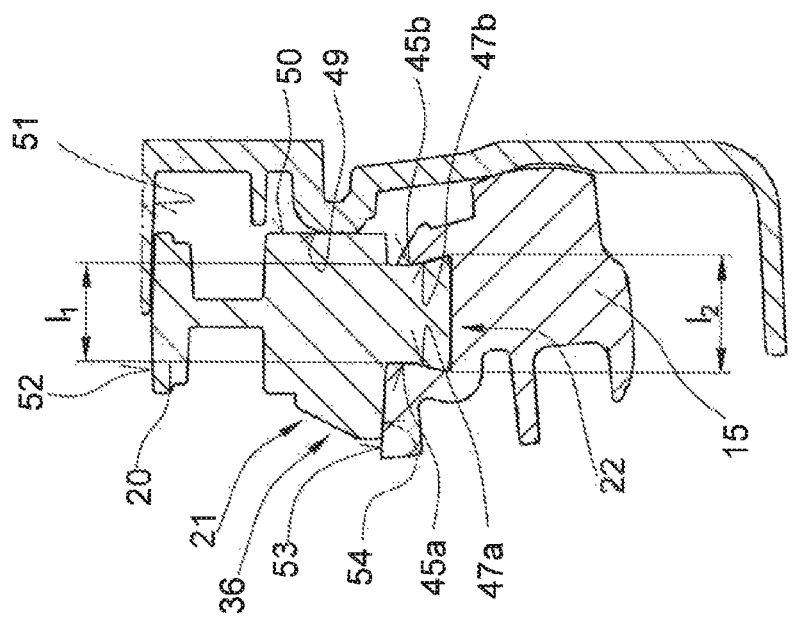

The latch element 20 comprises a locking region 21 that is in engagement with a strike 22 of the traverse 15 in the latched position (see for example FIG. 6 and FIG. 8 that shows the detail A in FIG. 6). The latch element 20 including the locking region 21 and the strike 22 are part of the latch 17. The locking region 21 comprises locking surfaces 45a and 45b (see FIG. 9) that cooperate with counter-bearing surfaces 47a and 47b of the traverse 15 in order to prevent pivoting of the head contact part 11 in one of the directions $u_1$ and $u_2$ in the latched position. Furthermore, the contact between a contact surface 46 of the locking region 21 and a contact surface 48 of the traverse 15 restricts the movement of the latch element 20 in the direction $y_2$.

Figure 9:
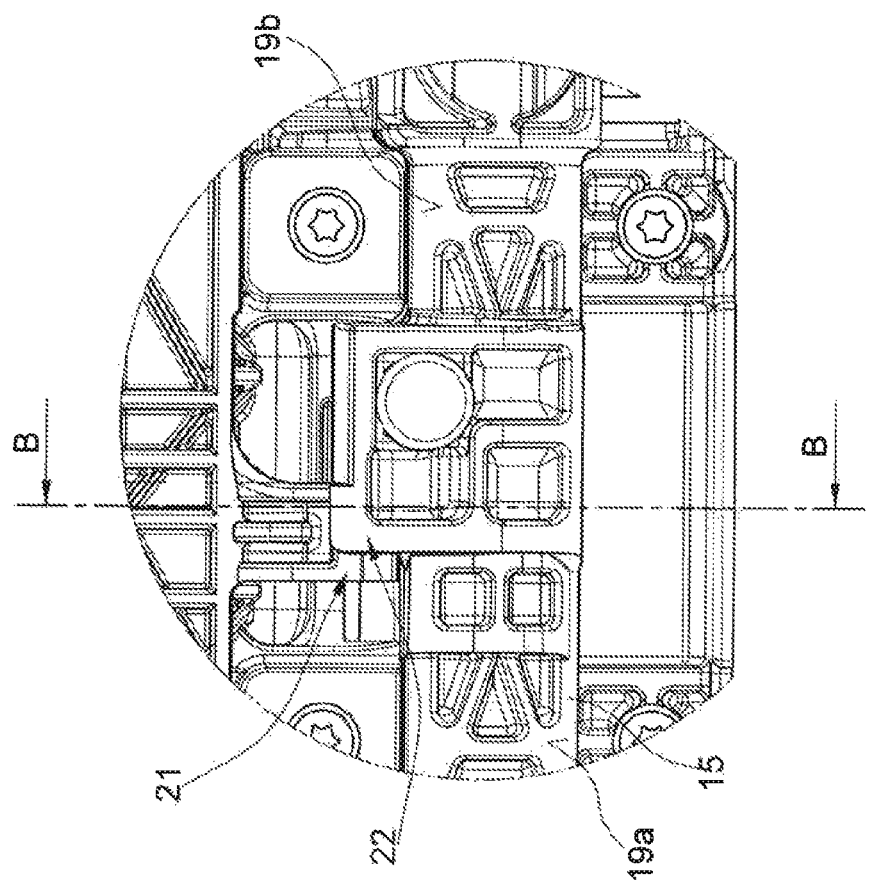

As shown in FIG. 9 that the locking region 21 is formed as a dovetail widening downward in the direction $z_2$. In other words, the part of the locking region 21 that engages in the strike 22 has a smaller dimension $I_1$ in the x-direction in the upper end than in a lower end that has a dimension $I_2$ in the x-direction. The strike 22 of the traverse 15 is formed complementary to the locking region 21. In this way, the locking region 21 is held in engagement with the strike 22 in a form-fitting manner in the latched position. Even with higher forces in the direction $x_1$ or $x_2$, which are transmitted by the housing 60 of the head contact part 11 to the latch element 20, it is fixed in engagement with the traverse 15, and the forces can be assumed reliably by the support bracket 12.

Moreover, the latch element 20 of FIG. 9 is guided in the rear part 29 of the head box by further slide surfaces. A lock external surface 50 of the locking region 21 cooperates with a slide surface 49 of the rear part 29, for example, and prevents movement of the latch element 20 in the direction $x_2$. Furthermore, a lock external surface 52 of the latch element 20 cooperates with a slide surface 51 of the rear part 29, preventing movement in the direction $z_1$.

Furthermore, as shown in FIG. 9 that the locking region 21 comprises a projection 36 that forms an abutment surface 54 that extends radially to the pivot axis a. The abutment surface 54 rests against a support surface 53 of the traverse 15 in the latched position. In this way, moments of the head contact part 11 can be assumed in the direction $u_1$ by the traverse that for example are caused because of a force that acts on the head contact part 11 from the rear (from the right in FIG. 9) in the direction $x_1$.

In the nonuse position, the support surface 53 cooperates as a stop with a surface of the rear part 29 in order to restrict the pivoting in the direction $u_1$.

Figure 10:
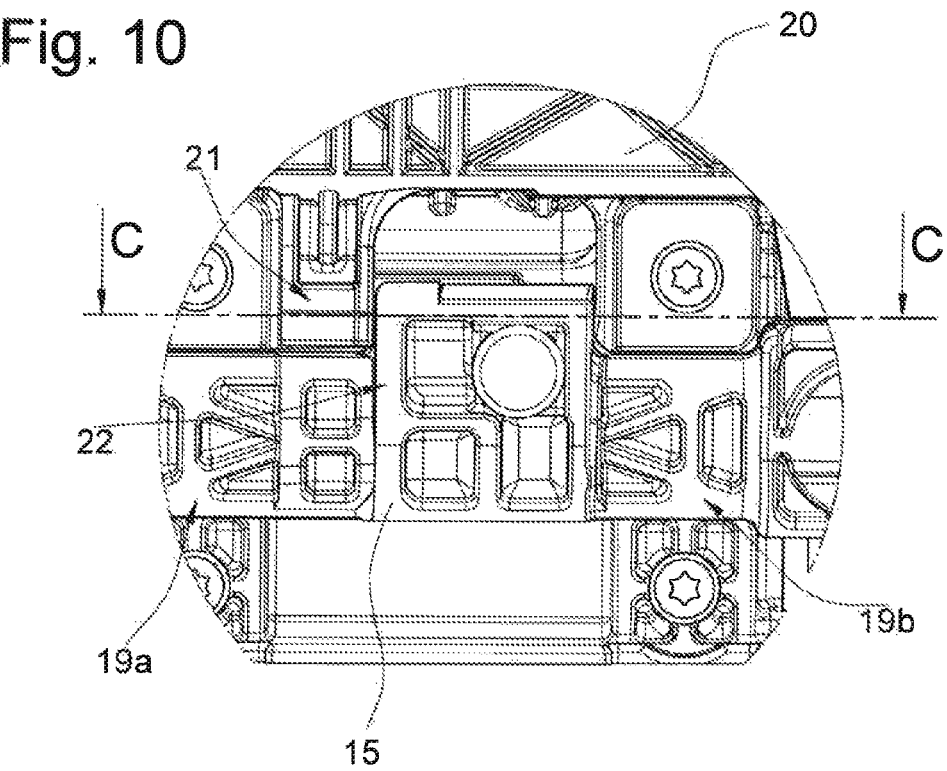
Figure 12:
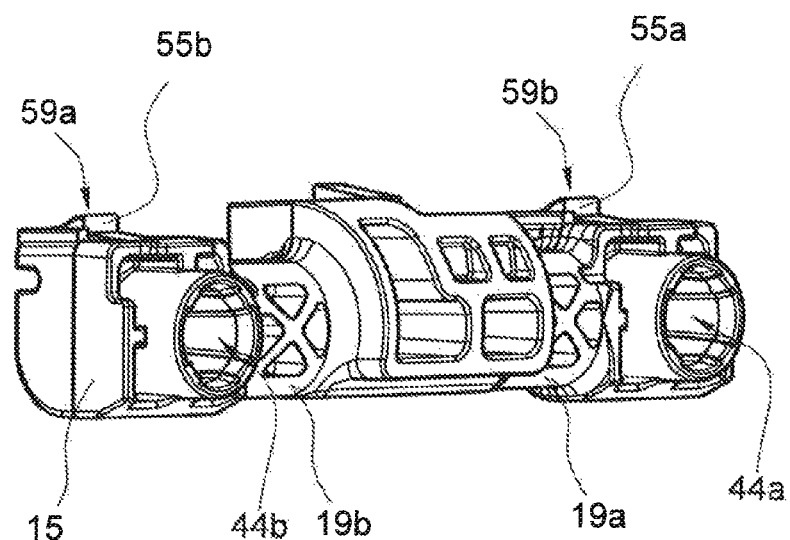
Figure 13:
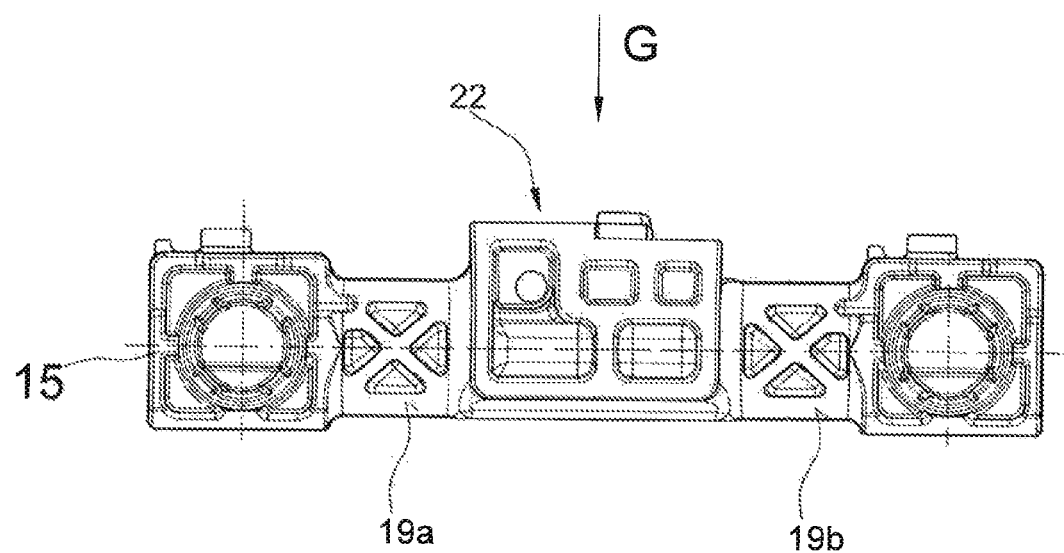
Figure 14:
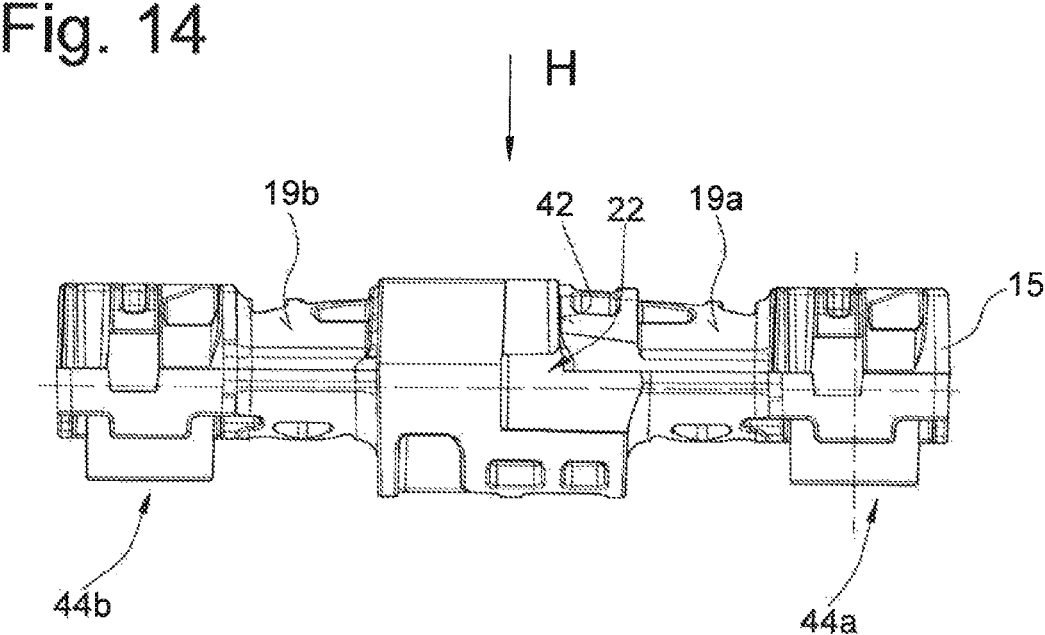
Figure 15:
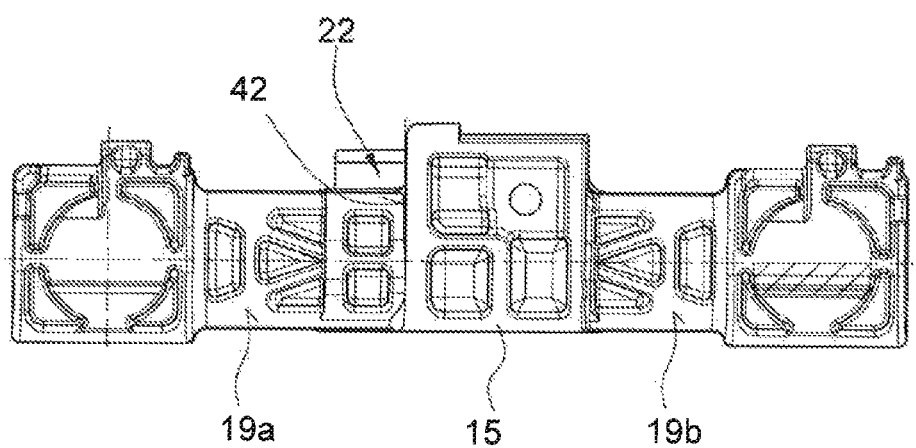
Figure 21:
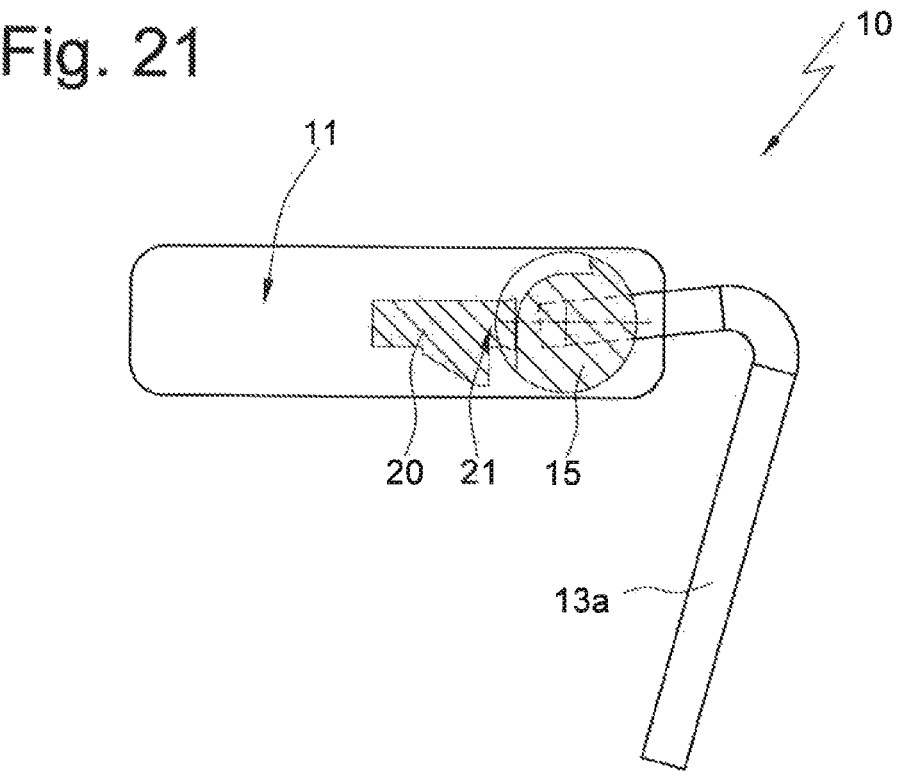
Figure 22:
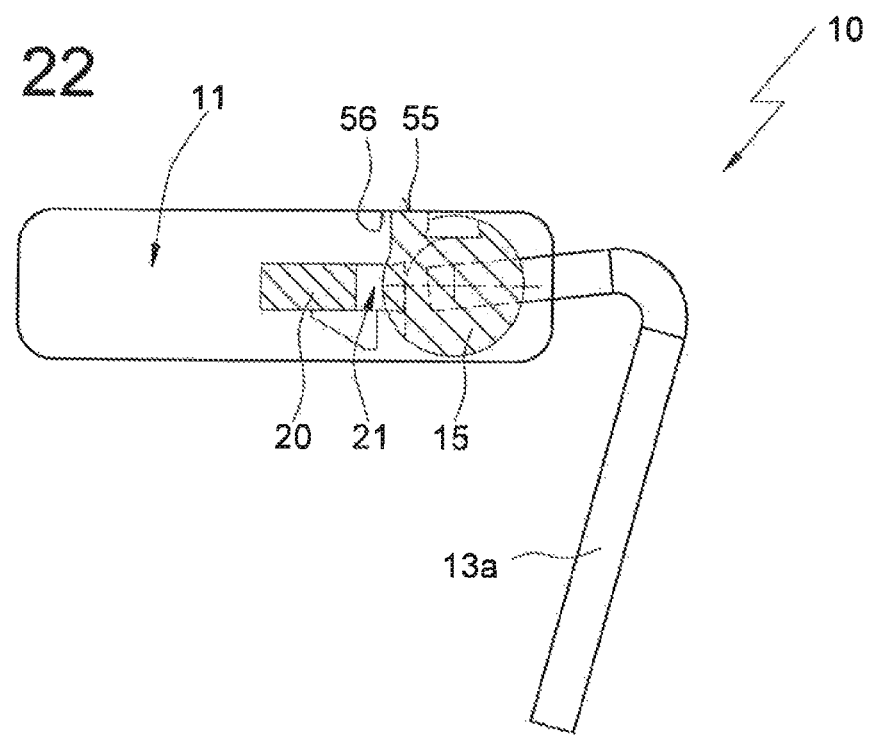

When the latch element 20 is moved to the released position, the locking region 21 is moved out of the engagement with the strike 22. The latch element 20 travels the path 13 between the latched position and the released position (see FIG. 11). In the released position of FIGS. 10 and 11, the locking region 21 is out of engagement with the strike 22.

In the released position of the latch 17, the head contact part 11 can be moved from the use position in the direction $u_1$ to the nonuse position by the springs 25. A contact surface 46 of the locking region 21 rests against a guide surface 42 of the traverse 15. The guide surface 42 holds the latch element 20 in the released position during the movement to the nonuse position against the force of the spring 23.

If the head contact part 11 is moved from the nonuse position to the use position, the latch element 20 is automatically moved to the latched position by the spring 23. Once the use position is reached, the locking region 21 rests no longer against the guide surface 42 and the latch element 20 can move in the direction $y_2$ to its initial position with the locking region 21 again moving into engagement with the strike 22.

A second embodiment of the headrest is described in the schematic FIGS. 16 to 22 that has the same functions as the first embodiment. It differs by the arrangement of the spring 23.

As can in particular be taken from FIG. 2, the invention allows the construction of a headrest 10 that is composed of a few parts. Production and assembly costs are therefore reduced compared to conventional headrests known from the prior art. Moreover, the headrest ensures high functional reliability.

The invention claimed is:

1. A headrest comprising:
   a head-contact part,
   two support rods on a vehicle seat,
   a traverse connecting the support rods, extending along an axis, made of plastic or of a composite material, formed with a dovetail-shaped strike formation extending axially and of a transverse width at a location proximal to the axis greater than at a remote from the axis, and pivotally supporting the head contact part for pivoting on the traverse between a use position and a nonuse position, and
   a latch element with an axially elongated dovetail-shaped counter formation slidable axially along of the dovetail strike formation and movable between
   a latched position fitting complementarily with the dovetail-shaped strike and inhibiting pivoting of the head-contact part on the traverse and
   an unlatched position not engaged with the dovetail strike formation and allowing such pivoting.

2. The headrest according to claim 1, further comprising: slide surfaces for the pivotal slide-mounting of the head contact part and molded on the traverse.

3. The headrest according to claim 1, further comprising: at least one strike for arresting the head contact part is and molded in at least one pivot position on the traverse.

4. The headrest according to claim 1, further comprising: at least one stop surface molded on the traverse and shaped to cooperate with a counter surface of the head contact part and to limit pivoting of the head contact part in at least one pivoting direction.

5. The headrest according to claim 1, wherein holes are formed on the traverse that each form a seat for a respective support rod.

6. The headrest according to claim 5, wherein at least a first stop formation is formed on the seat that prevents movement of the support rod in a demounting direction or with respect to a rotation in the hole around a longitudinal axis of the support rod.

7. The headrest according to claim 4, further comprising: a guide surface molded on the traverse and suitable to guide the latch element into engagement with the stop surface.

8. The headrest according to claim 2, wherein the head contact part comprises bearing surfaces that respectively cooperate with the slide surfaces and form a pivot bearing.

9. The headrest according to claim 1, wherein the latch element is formed as a slider that is mounted on the head contact part for straight-line movement along the axis of the traverse.

10. The headrest according to claim 1, wherein the latch element is actuatable by an actuator outside on the headrest, a housing of the head contact part having at least one recess holding the actuator, the recess and actuator being covered by an elastically deformable plastic skin.

* * * * *